United States Patent
Li et al.

(10) Patent No.: US 8,913,478 B2
(45) Date of Patent: Dec. 16, 2014

(54) METHODS AND APPARATUS FOR INTERLEAVING IN OFDM/OFDMA SYSTEMS

(75) Inventors: Lingjie Li, Ottawa (CA); Shiquan Wu, Nepean (CA)

(73) Assignee: Wi-Lan, Inc., Ottawa (CA)

(*) Notice: Subject to any disclaimer, the term of this patent is extended or adjusted under 35 U.S.C. 154(b) by 822 days.

(21) Appl. No.: 12/948,534

(22) Filed: Nov. 17, 2010

(65) Prior Publication Data

US 2011/0116359 A1 May 19, 2011

Related U.S. Application Data

(60) Provisional application No. 61/262,465, filed on Nov. 18, 2009.

(51) Int. Cl.
| | |
|---|---|
| *H04J 11/00* | (2006.01) |
| *H04L 5/00* | (2006.01) |
| *H04L 1/00* | (2006.01) |
| *H04B 1/38* | (2006.01) |
| *H04L 5/16* | (2006.01) |

(52) U.S. Cl.
CPC .......... *H04L 5/0044* (2013.01); *H04L 1/0043* (2013.01); *H04L 1/0071* (2013.01)
USPC .......................................... 370/208; 375/219

(58) Field of Classification Search
CPC ... H04L 1/0071; H04L 1/0043; H03M 13/27; H03M 13/03; H03M 13/25; H04W 28/04
USPC ................................................. 370/203–209
See application file for complete search history.

(56) References Cited

U.S. PATENT DOCUMENTS

| | | | | |
|---|---|---|---|---|
| 7,697,614 | B2* | 4/2010 | Barnes et al. | 375/245 |
| 2006/0034378 | A1* | 2/2006 | Lindskog et al. | 375/260 |
| 2007/0019747 | A1 | 1/2007 | Aldana | |
| 2009/0060068 | A1 | 3/2009 | Goswami et al. | |
| 2009/0190683 | A1* | 7/2009 | Awater et al. | 375/262 |
| 2011/0064167 | A1* | 3/2011 | Rezk et al. | 375/340 |

FOREIGN PATENT DOCUMENTS

EP  1926215  5/2008

OTHER PUBLICATIONS

International Search Report and Written Opinion issued on Mar. 29, 2011, in corresponding application No. PCT/CA2010/001818, 8 pages.

Siaud, I. et al., "Turbo-like Processing for Scalable Interleaving Pattern Generation: application to 60 GHz UWB-OFDM systems", IEEE International Conference on Ultra-Wideband, 2007, ICUWB 2007, Singapore, Sep. 24-26, 2007, pp. 436-441, ISBN: 978-1-4244-0521-3.

(Continued)

*Primary Examiner* — Xavier S. Wong
(74) *Attorney, Agent, or Firm* — Procopio, Cory, Hargreaves & Savitch LLP (57) ABSTRACT

An interleaver of an OFDM/OFDMA transceiver reshapes a binary vector to be transmitted into a matrix, rotates bits in respective columns of the matrix, divides respective rows of the matrix into an integer number of interleaving blocks, and interleaves the bits in the respective interleaving blocks.

20 Claims, 5 Drawing Sheets

(56) References Cited

OTHER PUBLICATIONS

IEEE P802.22™/ DRAFTv2.0 Draft Standard for Wireless Regional Area Networks Part 22: Cognitive Wireless RAN Medium Access Control (MAC) and Physical Layer (PHY) specifications: Policies and procedures for operation in the TV Bands, IEEE P802.22/D2.08, May 2009, Title page, i-vii and 1-509 (516 pages total).

* cited by examiner

METHODS AND APPARATUS FOR INTERLEAVING IN OFDM/OFDMA SYSTEMS

CROSS-REFERENCE TO RELATED APPLICATIONS

The present application claims the benefit of U.S. Application No. 61/262,465, filed Nov. 18, 2009, the contents of which are incorporated by reference in their entirety.

FIELD OF THE INVENTION

The present invention relates in general to communications systems, and more specifically to interleaving schemes used in orthogonal frequency-division multiplexing/orthogonal frequency-division multiple access (OFDM/OFDMA) communication systems.

BACKGROUND OF THE INVENTION

OFDM/OFDMA are viable modulation schemes for data transmission. OFDM has been adopted in a number of communication standards including digital subscriber line (DSL), Institute of Electrical and Electronics Engineers (IEEE) 802.11 for Wireless Fidelity (WiFi), and IEEE 802.16 for Worldwide Interoperability for Microwave Access (WiMAX). Orthogonal frequency-division multiple access (OFDMA) is a viable multiple access method based on OFDM, it enables time-frequency two-dimensional resource assignment to individual users in a communications network. OFDMA is widely used in communication standards such as IEEE 802.16 WiMAX and IEEE 802.22 for Wireless Regional Area Network (WRAN).

In most communications systems, a channel between a transmitter and a receiver introduces channel imperfections which result in errors in a transmitted message. For example, in a wireless communications system, a wireless multipath effect causes inter-symbol interference in the time domain and frequency selective fading in the frequency domain. An OFDM/OFDMA receiver can normally resolve the inter-symbol interference, but cannot recover errors caused by the frequency selective fading effect. In OFDM/OFDMA systems, messages are modulated onto subcarriers, and each subcarrier occupies a narrow-frequency band in the frequency domain. Due to the frequency selective fading in the wireless channel, signal attenuation for some frequency regions of the wireless frequency band may be significant. This is referred to as "deep fading". Transmitted subcarriers in deep fading regions are subject to errors that make the received message encoded on affected subcarriers unreliable. Moreover, a deep fading region usually affects multiple neighboring subcarriers. Deep fading may result in a cluster of errors in the bits modulated onto deep faded subcarriers that forward error correction (FEC) coding is unable to recover due to the concentrated juxtaposition of such errors.

The classical method of solving this problem is to use FEC coding in combination with a FEC encoded bit interleaving scheme. The purpose of the interleaving scheme is to randomize the bit pattern of the FEC encoded bit sequence so that deep fading produces distributed errors in the de-interleaved received signal. This greatly improves the performance of FEC.

There are many known interleaving schemes, including one defined by the IEEE 802.22 v2.0 standard for WRAN. Some interleaving schemes interleave the FEC encoded bits as well as the subcarriers. While most known interleaving schemes significantly improve FEC performance, many are complex and computationally intensive to implement.

It would therefore be advantageous to provide an interleaving scheme that is simple to implement while achieving all of the benefits of bit and subcarrier interleaving.

SUMMARY OF THE INVENTION

Embodiments of the invention provide an interleaving scheme that enables an improved interleaving effect with a lower computational complexity.

Embodiments therefore provide a method of interleaving a binary vector for transmission by an OFDM/OFDMA transmitter, comprising reshaping the binary vector into a matrix; rotating bits in respective columns of the matrix; dividing the bits in respective rows of the matrix into an integer number of interleaving blocks; and interleaving the bits in the respective interleaving blocks until each interleaving block in the matrix has been interleaved.

One aspect of the invention further provides an orthogonal frequency-division multiplexing (OFDM) transceiver, comprising a vector reshaper that reshapes a forward error correction encoded binary vector into a matrix; a bit rotator that rotates bits in respective columns of the matrix; and an interleaver that divides respective rows of the matrix into an integer number of interleaving blocks, and interleaves the bits in the respective interleaving blocks until each interleaving block in the matrix has been interleaved.

A further aspect provides an orthogonal frequency-division multiplexing multiple access (OFDMA) transceiver, comprising a vector reshaper that reshapes a forward error correction encoded binary vector into a matrix; a bit rotator that rotates bits in respective columns of the matrix; and an interleaver that divides the bits in respective rows of the matrix into an integer number of interleaving blocks, and interleaves the bits in the respective interleaving blocks until each interleaving block in the matrix has been interleaved.

A still further aspect provides a lookup table for implementing an interleaving scheme in an orthogonal frequency-division multiplexing (OFDM) transceiver, comprising an index for each bit in a forward error encoded binary vector to be transmitted by the OFDM transceiver, wherein when the respective bits in the binary vector are reordered using the respective indexes the reordering of the bits produces an effect in the reordered bits of the binary vector of: reshaping the binary vector into a matrix; rotating bits in respective columns of the matrix; dividing respective rows of the matrix an integer number of interleaving blocks; and interleaving the bits in the respective interleaving blocks until each interleaving block in the matrix has been interleaved.

An aspect of the invention further provides a method of interleaving a binary vector for transmission by an OFDM/OFDMA transmitter, comprising reshaping the binary vector into a matrix; dividing the bits in respective rows of the matrix into an integer number of interleaving blocks; interleaving the bits in the respective interleaving blocks until each interleaving block in the matrix has been interleaved; and rotating bits in respective columns of the matrix.

BRIEF DESCRIPTION OF THE DRAWINGS

The invention is described with reference to the following drawings, where like reference numerals designate corresponding parts.

DETAILED DESCRIPTION OF THE PREFERRED EMBODIMENTS

Embodiments of the present invention can provide a bit interleaving scheme for an OFDM/OFDMA transceiver and OFDM/OFDMA transceivers that implement the interleaving scheme in firmware or software. The bit interleaving scheme is less computationally intensive to implement than known interleaving schemes, and can be implemented as an interleaving index lookup table. In accordance with the bit interleaving scheme, binary vectors output by encoder(s) are reshaped into a matrix; bits in respective columns of the matrix are rotated; the bits in respective rows of the matrix are divided into an integer number of interleaving blocks; and the bits in the respective interleaving blocks are interleaved until each interleaving block in the matrix has been interleaved. The bit interleaving can optionally be performed before the bit rotation.

Figure 1:
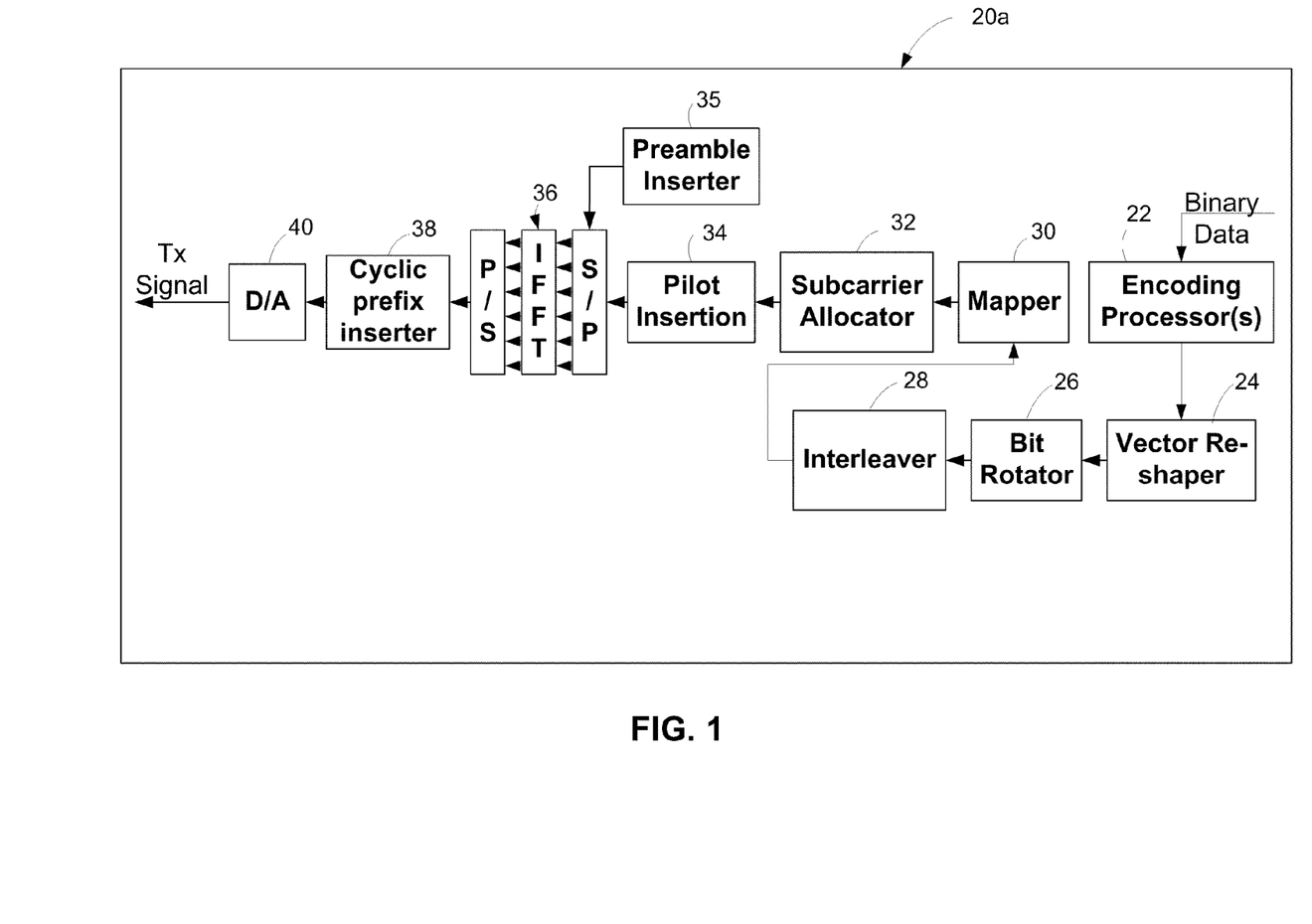
FIG. 1 is a functional block diagram of one embodiment of an OFDM/OFDMA transceiver in accordance the invention.

FIG. 1 is a block diagram of an OFDM/OFDMA transceiver 20a in accordance with one embodiment of the invention, only relevant parts of a transmit side of the transceiver being shown. Other components of the transceiver 20a are well known to those skilled in the art and are not shown or described. As is well understood by those skilled in the art, binary data to be transmitted by the transceiver 20a is passed to one or more coding/encoding processor(s), hereinafter referred to simply as encoding processor 22. The encoding processor 22 performs scrambling, FEC encoding and puncturing, all in a manner well understood in the art. Each encoding processor 22 outputs a sequence of FEC encoded binary vectors. Those binary vectors are passed to a vector re-shaper 24. The vector re-shaper 24 converts each FEC encoded binary vector into an $N_{b/sub}$ by $N_{sub}$ matrix M having a number $N_{b/sub}$ of columns equal to a number of bits to be modulated onto a subcarrier in an OFDM/OFDMA symbol to be transmitted by the transceiver 20a, and a number $N_{sub}$ of rows equal to a number of data subcarriers used for the transmission of the vector, as will be explained below in detail with reference to FIG. 4.

The matrix M thus created is passed to a bit rotator 26. The bit rotator 26 rotates the bits in the matrix, as will also be explained below in detail with reference to FIG. 4. The bit-rotated matrix M is then passed to an interleaver 28. The interleaver 28 interleaves the rotated bits in accordance with an interleaving index computed as described below with reference to FIG. 4. The output of the interleaver 28 is a binary vector sequence that is used as input to a constellation mapper 30. The mapper 30 maps the respective bits of the binary sequence to a complex value according to the constellation scheme in a manner well known in the art and the respective complex values are passed to a subcarrier allocator 32 that allocates each complex value to a predetermined subcarrier. Pilot tones are modulated onto the pilot subcarriers by pilot insertion 34 to help the receiver to equalize the channel, and a preamble is inserted for each OFDM/OFDMA symbol by preamble inserter 35, both of which are accomplished in a manner well known in the art. The signal is then converted by a serial-to-parallel interface (S/P) from serial mode to parallel mode for presentation to an Inverse Fast Fourier Transform (IFFT) 36, which converts the frequency domain signal to a time domain signal in a manner well known in the art. The time domain signal is converted back to serial mode by a parallel-to-serial interface (P/S) and passed to a cyclic prefix inserter 38 which inserts a cyclic prefix for each OFDM symbol and assembles an OFDM/OFDMA frame that will be transmitted by the transceiver 20a. A digital to analog converter 40 then converts the time domain digital signal to an analog transmit (Tx) signal that is passed to transmit equipment (not shown) which transmits the signal as a wireless radio signal in a manner well known in the art.

Figure 2:
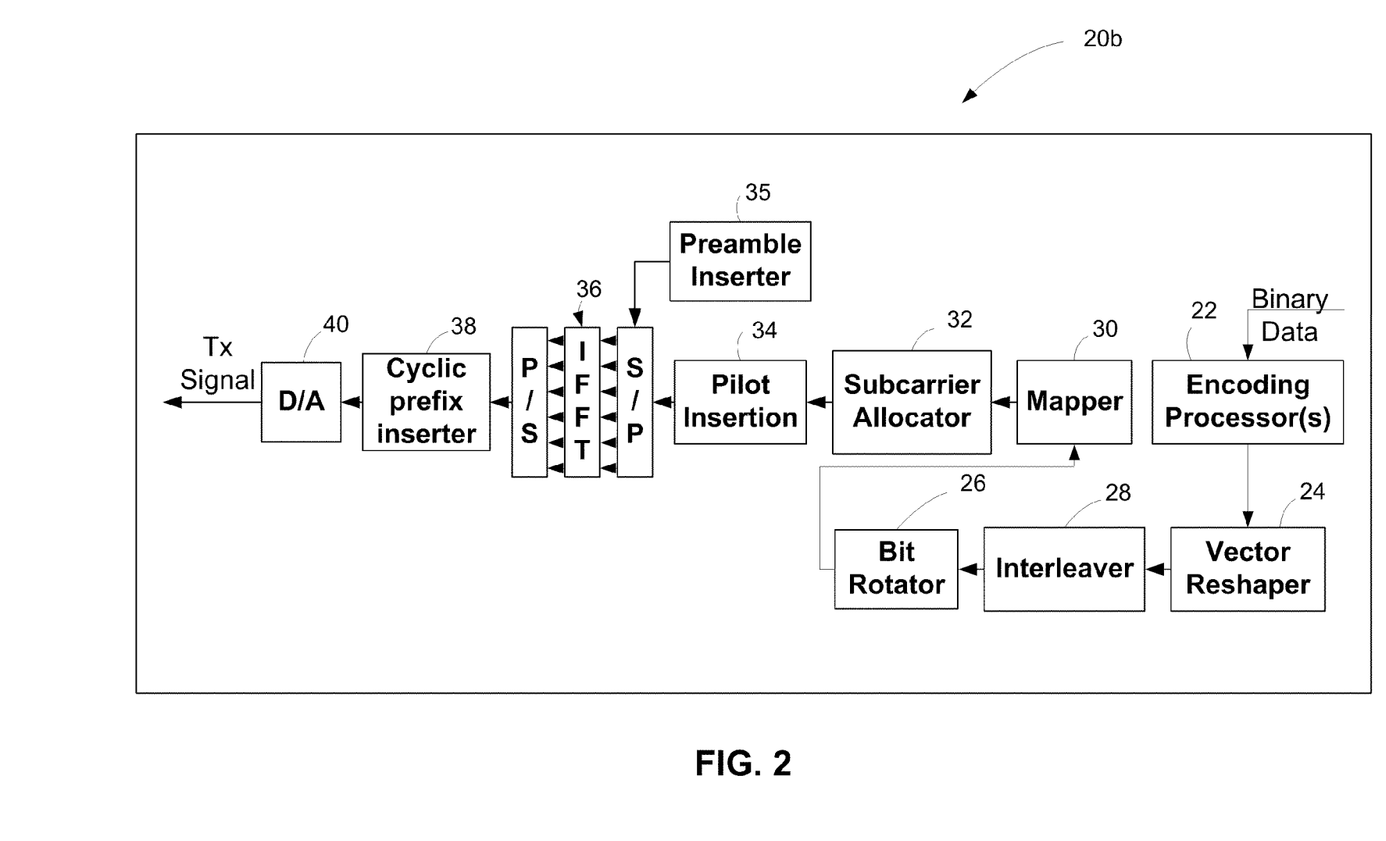
FIG. 2 is a functional block diagram of another embodiment of an OFDM/OFDMA transceiver in accordance with the invention.

FIG. 2 is a schematic block diagram of a transceiver 20b in accordance with another embodiment of the invention. The transceiver 20b is identical to transceiver 20a described above, except that the interleaver 28 receives each matrix from the vector reshaper 24 and performs the interleaving function before the bit rotator 26 rotates the bits of each matrix, as described above. It is immaterial whether the bits of the reshaped vectors are first rotated or interleaved, as will also be explained below in more detail with reference to FIG. 4.

Figure 3:
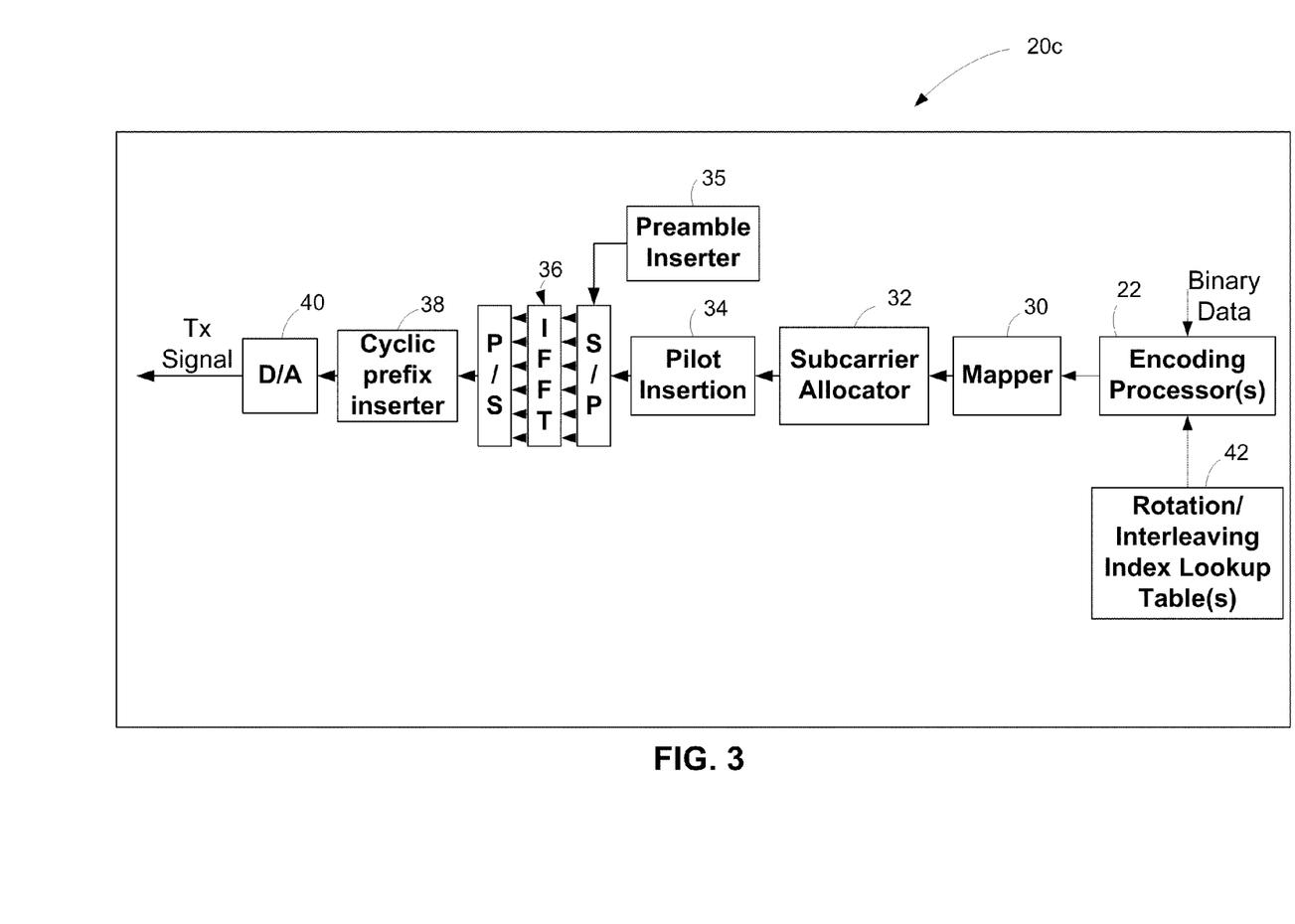
FIG. 3 is a functional block diagram of yet another embodiment of an OFDM/OFDMA transceiver in accordance with one embodiment of the invention.

FIG. 3 is a schematic block diagram of a transceiver 20c in accordance with yet another embodiment of the invention, in which the vector reshaper 24, the bit rotator 26 and the interleaver 28 are replaced by an interleaving index lookup table 42. As will be understood from the description that follows, the interleaving scheme is a deterministic operation, i.e., the interleaved location of each input bit can be pre-determined before the interleaving process. This permits a simple lookup table type of implementation in which the encoding processor(s) 22 use a rotation/interleaving index stored in the rotation/interleaving index lookup table(s) 42 to achieve the effect of reshaping, rotating and interleaving the FEC encoded binary vectors in a single bit reordering operation before those binary vectors are passed to the constellation mapper 30. If more than one encoding processor 22 is used, as in the case of an OFDMA transceiver, a rotation/interleaving index table 42 can be constructed for each encoding processor, as a matter of design choice. When the respective bits in the binary vector are reordered using the respective indexes, the reordering of the bits produces an effect in the reordered bits of the binary vector of reshaping the binary vector into a matrix; rotating bits in respective columns of the matrix; dividing respective rows of the matrix an integer number of interleaving blocks; and, interleaving the bits in the respective interleaving blocks until each interleaving block in the matrix has been interleaved. This yet further reduces the computational intensity of the interleaving scheme. Of course, as explained above, it is immaterial whether the bits of the matrix are first rotated or interleaved.

Figure 4:
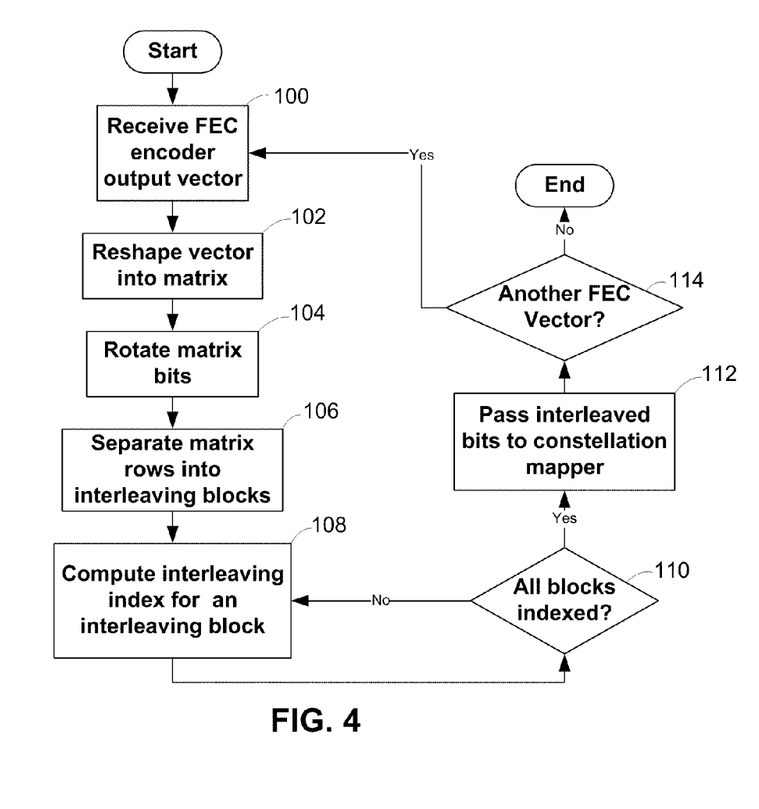
FIG. 4 is flow diagram of a method of computing an interleaving index in accordance with one embodiment of the invention.

FIG. 4 is a flow diagram illustrating one method implementing the interleaving scheme in the transceiver 20a shown in FIG. 1. As explained above, the output of the encoding processor 22 is a sequence of binary vectors with length $N_b = N_{sub} \cdot N_{b/sub}$, where $N_b$ is the number of data bits in the binary vector, $N_{sub}$ is the number of data subcarriers used for the transmission of the binary vector, and $N_{b/sub}$ is the number of bits modulated onto each data subcarrier. For example, $N_{b/sub}=2$ for QPSK, 4 for 16QAM, and 6 for 64QAM. The binary vectors may contain FEC encoded sequences output by more than one encoding processor 22, as explained above for the OFDMA downlink case in which multiple encoded sequences are transmitted, each sequence being assigned to a specific user. The binary vectors may also include all zero binary sequences without FEC coding. For example, in an OFDMA uplink only one FEC encoded sequence is transmitted on a number of subcarriers, while the other subcarriers transmit zero values. It should also be noted that the $N_{sub}$ subcarriers may be allocated to more than one OFDM symbol. However, with respect to practicing the invention the origin and bit values of the binary vectors is immaterial.

The binary vectors may be represented by $v=[v_1 \; v_2 \ldots v_m]$ where $v_i=[b_{i,1}' \ldots b_{i,N_i}']$ is a binary sequence received from an encoder. In other words, binary vector v is a concatenation of a number of binary sequences, any one or more of which may be FEC encoded. The neighboring $v_i$'s may come from different encoding processes or encoders (encoding processors 22), or may be sub-sequences of a binary vector output by a single encoding processor 22. Note that $$\sum_{i=1}^{M} N_i = N_b.$$

$N_i$ is an integer multiple of $N_{b/sub}$. Each $v_i$ is reshaped into an $N_{b/sub}$ by $N_i/N_{b/sub}$ sub-matrix $$M_i = \begin{bmatrix} b'_{i,1} & b'_{i,2} & \ldots & b'_{i,N_i/N_{b/sub}} \\ b'_{i,N_i/N_{b/sub}+1} & b'_{i,N_i/N_{b/sub}+2} & \ldots & b'_{i,2N_i/N_{b/sub}} \\ \ldots & \ldots & \ldots & \ldots \end{bmatrix}$$

en the vector v is reshaped (102) into an $N_{b/sub}$ by $N_{sub}$ matrix: $M=[M_1 \; M_2 \ldots M_m]$.

The matrix M is passed to the bit rotator 26 which performs (104) the bit rotation. Let $[b_{0,i} \ldots b_{j,i} \ldots b_{N_{b/sub}-1,i}]^T = \{b_{j,i}\}$ (j=0, ..., $N_{b/sub}-1$) denote the i'th column of matrix M (i=1, ..., $N_{sub}$). After the bit rotation, the i'th column becomes $\{b_{j',i}\}$, where j'=mod $[(i-1) \cdot k_d+k_0+j, N_{b/sub}]$, $k_0 \in [0, N_{b/sub}-1]$ is the rotated index for $b_{0,1}$, and $k_d$ is the rotation step size. One typical set of parameters for $k_d$ and $k_0$ are $k_d=1$ or $-1$, $k_0=0$. Here, the operation mod(a,b) is the modulus after division. The operation results in a value c with $a=b \cdot d+c$, where a, b, c, and d are non-negative integers and $c \in [0, b-1]$.

The bit rotated matrix is then passed to the interleaver 28, which performs the bit interleaving. For example, if K denotes the interleaving block size, and each row in matrix M contains an integer number of interleaving blocks, then each row of matrix M can be separated (106) into individual interleaving blocks, and interleaving is conducted within each block as follows.

Specifically, if k=0, 1, ..., K−1 denotes the indices of the K bits within an interleaving block before interleaving, and $L_{L_0,L_d}(k)$ denotes the indices of the same bits after the interleaving. Then $L_{L_0,L_d}(k)$ is computed (108) using the following iterative formula:

$$L_{L_0,L_d}(k) = \begin{cases} L_0, & k=0; \\ \mathrm{mod}[L_{L_0,L_d}(k-1)+L_d, K], & k \geq 1. \end{cases}$$

Here, $L_0 \in [0, K-1]$ is an integer value, and $L_d \in [1, K-1]$ is the modulo difference between neighboring $L_{L_0,L_d}(k)$'s.

The above equation can be rewritten as $L_{L_0,L_d}(k) = \mathrm{mod}\; [L_0+k \cdot L_d, K], \; k \in [0, K-1]$.

In the above equation, any $L_0$ can be represented by $L_0=L_0'+i \cdot K$ where $L_0' \in [0, K-1]$ and i is an integer. As a result, $L_{L_0,L_d}(k) = L_{L_0',L_d}(k)$. This is the reason to restrict the range of $L_0$ as $L_0 \in [0, K-1]$.

With respect to the value of $L_d$, it can be restricted to the range of $L_d \in [1, K-1]$ following the same reasoning as above. Moreover, $L_{L_0,L_d}(k)$'s form a permutation vector of the indices 0, 1, ..., K−1. In other words, for any indices $k_1 \in [0, K-1]$ and $k_2 \in [0, K-1]$ with $k_1 \neq k_2$, the following inequality must be satisfied:

$L(k_1) \neq L(k_2)$, or $\mathrm{mod}\; [L_0+k_1 \cdot L_d, K] \neq \mathrm{mod}\; [L_0+k_2 \cdot L_d, K]$, or $(k_1-k_2) \cdot L_d \neq m \cdot K$ for any integer m.

The above requirement is satisfied if and only if $L_d$ and K are mutually prime, i.e., the largest common divisor of $L_d$ and K is 1.

In addition, if $L_d'=K-L_d$, then $L_{L_0,L_d'}(K-k) = \mathrm{mod}\; [L_0+(K-k) \cdot (K-L_d), K] = L_{L_0,L_d}(k)$.

In other words, $L_{L_0,L_d'}(k)$ is the reversed index sequence of $L_{L_0,L_d}(k)$.

In summary, all possible interleaving patterns $L_{L_0,L_d}(k)$ can be computed by limiting $L_0$ in the range $L_0 \in [0, K-1]$, and limiting $L_d$ as a mutually prime integer of K in the range $L_d \in [1, K/2-1]$.

After computing the interleaving index for an interleaving block, it is determined (110) if all interleaving blocks in the matrix M have been interleaved. If not, the interleaving index is computed (108) for another interleaving block in the matrix M. When all of the interleaving blocks have been interleaved the interleaved bits are passed (112) to the constellation mapper 30, and it is determined (114) if there is another FEC vector to be interleaved. If so, the process repeats from (100). If not, the process ends.

The interleaving scheme for the case where K=288 in Table 232 (not shown) of the IEEE 802.22 draft v2.0 can be obtained using the formulas set out above if $L_0=231$ and $L_d=121$. However, embodiments of the interleaving scheme in accordance with the invention are much less computationally intensive to implement than the one defined in the 802.22 draft v2.0.

As explained above, the output of the interleaver 28 is passed (112) to the constellation mapper 30. Each column contains $N_{b/sub}$ bits and is used to modulate a subcarrier. A total of $N_{sub}$ subcarriers can be modulated using the bits of the interleaved matrix M. The output of the constellation mapper 30 is a sequence of $N_{sub}$ complex values. These values are sequentially allocated by the subcarrier allocator 32 to the physical subcarriers in the OFDM/OFDMA symbols that are used to transmit the bits of the interleaved matrix M, as described above.

It should be noted that the input and output indices for each interleaving block can be exchanged. That is, a bit at index $L_{L_0,L_d}(k)$ in the input sequence of the interleaver may be reallocated at index k in the output sequence of the interleaver.

Figure 5:
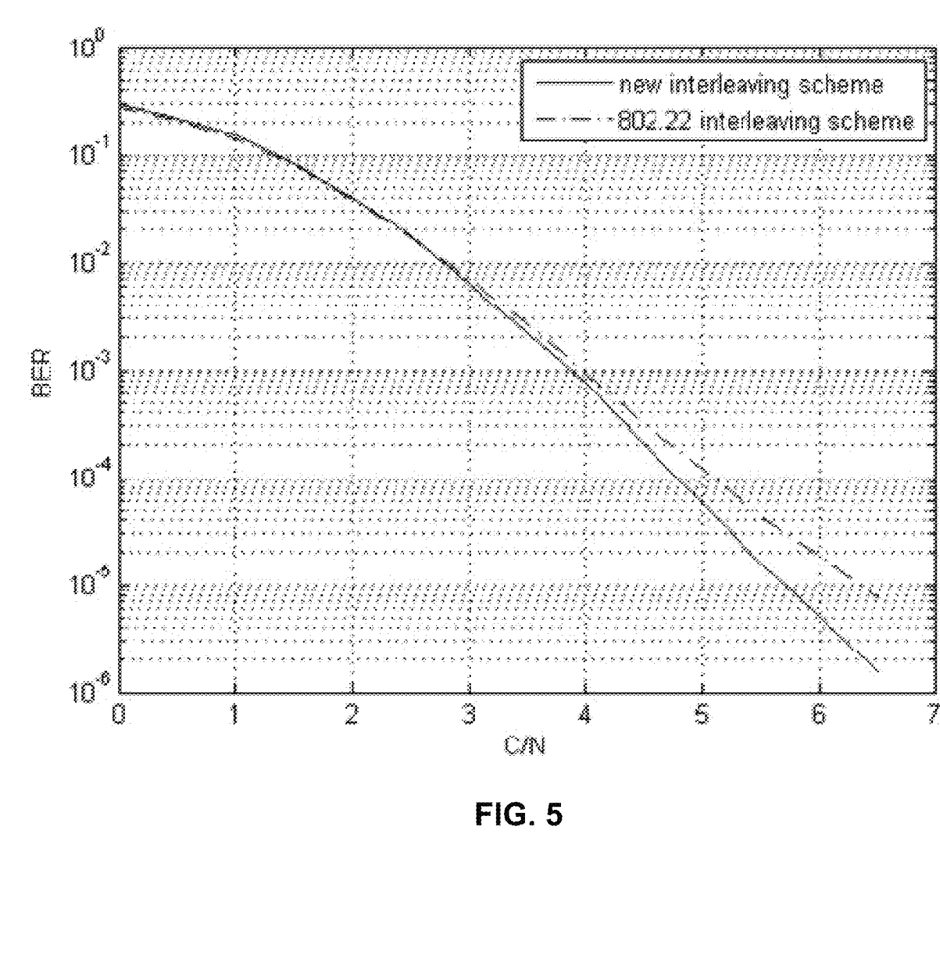
FIG. 5 is a graph illustrating a performance comparison between an interleaving scheme in accordance with the invention and the interleaving scheme specified by the IEEE 802.22, v2.0 standard.

Simulation results show that the interleaving scheme described herein performs better than the interleaving scheme in IEEE 802.22 draft 2.0. For example, FIG. 5 shows the simulated bit error rate (BER) performance of the interleaving scheme compared with the simulated performance of the 802.22, v2.0 interleaving scheme. In this simulation, $N_{sub}=1440$, $N_{b/sub}=2$ (QPSK), K=288, $L_d=119$, $L_0=0$. One OFDM symbol is used for the transmission of each binary vector.

The embodiment of the invention described above with reference to FIG. 4 first performs bit rotation, followed by bit interleaving. In the interleaving process, $L_{L_0,L_d}(k)$ is used as the input index. In the IEEE 802.22 interleaving scheme, the convolutional coding rate is ½, the bit interleaver block size is 288.

Table 1 compares the interleaving scheme in accordance with the embodiment of the invention described above to the IEEE 802.22, v2.0 interleaving scheme. From Table 1, it is apparent that the interleaving schemes described herein perform better than the IEEE 802.22 interleaving scheme. In Table 1, R+BI indicates bit rotation is performed before interleaving, as explained above with reference to FIG. 1; BI+R indicates interleaving is performed before bit rotation, as explained above with reference to FIG. 2. In Table 1, $N_{sub}=1440$, $L_0=0$. In the 802.22 scheme, convolutional coding rate is ½, the bit interleaving block size is 288.

TABLE 1 comparison of the interleaving scheme with the 802.22 scheme

| | QPSK, C/N = 6.5 dB | 16QAM, C/N = 12 dB | 64QAM, C/N = 17 dB |
|---|---|---|---|
| 802.22 scheme | 7.5e−6 | 6.7e−6 | 4.4e−6 |
| New scheme: BI + R K = 288, $L_d$ = 119 | 2.0e−6 | 4.7e−6 | 2.1e−6 |
| New scheme: R + BI K = 288, $L_d$ = 119 | 1.6e−6 | 3.2e−6 | 3.3e−6 |
| New scheme: BI + R K = 288, $L_d$ = 121 | 1.1e−6 | 2.1e−6 | 2.5e−6 |
| New scheme: R + BI K = 288, $L_d$ = 121 | 1.6e−6 | 1.7e−6 | 2.6e−6 |
| New scheme: BI + R K = 1440, $L_d$ = 559 | 2.0e−6 | 3.8e−6 | 2.7e−6 |
| New scheme: R + BI K = 1440, $L_d$ = 559 | 1.5e−6 | 4.4e−6 | 2.4e−6 |
| New scheme: BI + R K = 1440, $L_d$ = 379 | 2.7e−6 | 2.7e−6 | 2.0e−6 |
| New scheme: R + BI K = 1440, $L_d$ = 379 | 2.0e−6 | 2.9e−6 | 2.8e−6 |

As explained above with reference to FIG. 3, the interleaving scheme is a deterministic operation, i.e., the location of each input bit can be predetermined before the interleaving process. This permits a simple lookup table type of implementation in which the encoding processor 22 uses a bit rotation/interleaving index stored in the rotation/interleaving index lookup table 42 to interleave the FEC encoded binary vectors before they are passed to the constellation mapper 30. The vector reshaping, bit rotation and bit interleaving are combined in a single lookup table index that permits all three operations to be accomplished in a single bit reordering operation that is accomplished by the encoding processor(s) 22, which reorder(s) the respective bits in a binary vector using the bit rotation/interleaving index(es).

As explained above, in an OFDMA system, a number of physical subcarriers may be allocated to a user. If the interleaving scheme is implemented in an OFDMA transceiver, then each group of binary bits allocated to a given number of subcarriers are kept on the same number of subcarriers after the interleaving procedure, while a physical location of the subcarriers is distributed in the frequency band. This feature satisfies the OFDMA requirements while providing desirable frequency diversity.

It should be understood that the present invention is not limited to only those implementations that are described above. Those of skill in the art will appreciate that the various illustrative modules, functional blocks and method steps described in connection with the above described illustrations and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, functional block or step is for ease of description. Specific functions can be moved from one module, functional block or step to another without departing from the invention.

The various illustrative modules, functional blocks and method steps described in connection with the implementations disclosed herein can be implemented or performed with a processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of computer readable storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations.

We claim:

1. A method of interleaving a binary vector for transmission by an OFDM/OFDMA transmitter, comprising:
generating a forward error correction encoded binary vector from binary data to be transmitted;
reshaping the forward error correction encoded binary vector into a matrix;
rotating bits in respective columns of the matrix;
dividing the bits in respective rows of the matrix into an integer number of interleaving blocks; and
interleaving the bits in the respective interleaving blocks until each interleaving block in the matrix has been interleaved,
wherein the steps of reshaping the forward error correction encoded binary vector, rotating the bits, dividing the rows into interleaving blocks and interleaving the bits in each interleaving block are performed in a single bit reordering operation on bits in the forward error correction encoded binary vector using a rotation/interleaving index lookup table.

2. The method as claimed in claim 1 wherein the forward error correction encoded binary vectors are represented by $v=[v_1\ v_2 \ldots v_m]$ where $v_i=[b_{i,1}' \ldots b_{i,N_i}']$ is a binary sequence received from an encoder, and reshaping the forward error correction encoded binary vector comprises reshaping each $v_i$ into an $N_{b/sub}$ by $N_i/N_{b/sub}$ sub-matrix $$M_i = \begin{bmatrix} b'_{i,1} & b'_{i,2} & \ldots & b'_{i,N_i/N_{b/sub}} \\ b'_{i,N_i/N_{b/sub}+1} & b'_{i,N_i/N_{b/sub}+2} & \ldots & b'_{i,2N_i/N_{b/sub}} \\ \ldots & \ldots & \ldots & \ldots \end{bmatrix},$$

and reshaping the vector v into a matrix $M=[M_1\ M_2 \ldots M_m]$.

3. The method as claimed in claim 2 wherein rotating the bits in the respective columns of the matrix M comprises rotating an i'th column $[b_{0,i} \ldots b_{j,i} \ldots b_{N_{b/sub}-1,i}]^T = \{b_{j,i}\}$ ($j=0, \ldots, N_{b/sub}-1$) of the matrix so that the rotated column is $\{b_{j',i}\}$, where $j'=\text{mod}\,[(i-1)\cdot k_d+k_0+j, N_{b/sub}]$; $k_0$ is a rotated index for $b_{0,1}$; and, $k_d$ is a rotation step size.

4. The method as claimed in claim 3 wherein parameters for $k_d$ and $k_0$ are $k_d=1$ or $-1$, $k_0=0$.

5. The method as claimed in claim 2 wherein interleaving the bits in the respective interleaving blocks comprises computing interleaved indices L (k) for respective bits of the respective interleaving blocks using:

$$L(k) = \begin{cases} L_0, & k=0; \\ \text{mod}[L(k-1)+L_d, K], & k>1. \end{cases}$$

where: K is the interleaving block size, $L_0\epsilon[0, K-1]$ is an integer value, and $L_d\epsilon[1, K-1]$ is a modulo difference between neighboring L(k)'s.

6. The method as claimed in claim 5 wherein the largest common divisor of $L_d$ and K is 1.

7. An orthogonal frequency-division multiplexing (OFDM) transceiver, comprising:
generating a forward error correction encoded binary vector from binary data to be transmitted;
a vector reshaper that reshapes a the forward error correction encoded binary vector into a matrix;
a bit rotator that rotates bits in respective columns of the matrix; and
an interleaver that divides respective rows of the matrix into an integer number of interleaving blocks, and interleaves the bits in the respective interleaving blocks until each interleaving block in the matrix has been interleaved,
wherein the vector reshaper, the bit rotator and the interleaver comprise a single bit reordering operation that uses a rotation/interleaving index lookup table to reorder the bits in the forward error correction encoded binary vector.

8. The OFDM transceiver as claimed in claim 7 wherein the binary vectors are represented by $v=[v_1\ v_2 \ldots v_m]$ where $v_i=[b_{i,1}' \ldots b_{i,N_i}']$ is a binary sequence received from an encoder, and the vector reshaper reshapes each $v_i$ into an $N_{b/sub}$ by $N_i/N_{b/sub}$ sub-matrix $$M_i = \begin{bmatrix} b'_{i,1} & b'_{i,2} & \ldots & b'_{i,N_i/N_{b/sub}} \\ b'_{i,N_i/N_{b/sub}+1} & b'_{i,N_i/N_{b/sub}+2} & \ldots & b'_{i,2N_i/N_{b/sub}} \\ \ldots & \ldots & \ldots & \ldots \end{bmatrix},$$

and then reshapes the vector v into a matrix $M=[M_1\ M_2 \ldots M_m]$.

9. The OFDM transceiver as claimed in claim 7 wherein the bit rotator rotates the bits in the respective columns of the matrix M by rotating an i'th column $[b_{0,i} \ldots b_{j,i} \ldots b_{N_{b/sub}-1,i}]^T = \{b_{j,i}\}$ ($j=0, \ldots, N_{b/sub}-1$) of the matrix M so that the rotated column is $\{b_{j',i}\}$, where $j'=\text{mod}\,[(i-1)\cdot k_d+k_0+j, N_{b/sub}]$; $k_0$ is a rotated index for $b_{0,1}$; and, $k_d$ is a rotation step size.

10. The OFDM transceiver as claimed in claim 9 wherein the interleaver interleaves the bits in the respective interleaving blocks by computing interleaved indices L (k) of respective bits of the respective interleaving blocks using:

$$L(k) = \begin{cases} L_0, & k=0; \\ \text{mod}[L(k-1)+L_d, K], & k>1. \end{cases}$$

where: K is the interleaving block size, $L_0\epsilon[0, K-1]$ is an integer value, and $L_d\epsilon[1, K-1]$ is a modulo difference between neighboring L(k)'s.

11. An orthogonal frequency-division multiplexing multiple access (OFDMA) transceiver, comprising:
generating a forward error correction encoded binary vector from binary data to be transmitted;
a vector reshaper that reshapes a the forward error correction encoded binary vector into a matrix;
a bit rotator that rotates bits in respective columns of the matrix; and
an interleaver that divides the bits in respective rows of the matrix into an integer number of interleaving blocks, and interleaves the bits in the respective interleaving blocks until each interleaving block in the matrix has been interleaved,
wherein the vector reshaper, the bit rotator, and the interleaver comprise a single bit reordering operation that uses a rotation/interleaving index lookup table to reorder the bits in the forward error correction encoded binary vector.

12. The OFDMA transceiver as claimed in 11 wherein the binary vectors are represented by $v=[v_1\ v_2 \ldots V_m]$ where $v_i=[b_{i,1}' \ldots b_{i,N_i}']$ is a binary sequence received from an encoder, and the vector reshaper reshapes each $v_i$ into an $N_{b/sub}$ by $N_i/N_{b/sub}$ sub-matrix $$M_i = \begin{bmatrix} b'_{i,1} & b'_{i,2} & \cdots & b'_{i,N_i/N_{b/sub}} \\ b'_{i,N_i/N_{b/sub}+1} & b'_{i,N_i/N_{b/sub}+2} & \cdots & b'_{i,2N_i/N_{b/sub}} \\ \cdots & \cdots & \cdots & \cdots \end{bmatrix},$$

and then reshapes the vector v into a matrix $M=[M_1 \ M_2 \ \ldots \ M_m]$.

13. The OFDMA transceiver as claimed in claim 11 wherein the bit rotator rotates the bits in the respective columns of the matrix by rotating an i'th column $[b_{0,i} \ldots b_{j,i} \ldots b_{N_{b/sub}-1,i}]^T = \{b_{j,i}\}$ $(j=0, \ldots, N_{b/sub}-1)$ of the matrix so that the rotated column is $\{b_{j',i}\}$, where $j'=\mathrm{mod}\ [(i-1)\cdot k_d+k_0+j, N_{b/sub}]$; $k_0$ is a rotated index for $b_{0,1}$; and, $k_d$ is a rotation step size.

14. The OFDMA transceiver as claimed in claim 13 wherein the interleaver interleaves the bits in the respective interleaving blocks by computing interleaved indices L (k) for respective bits of the respective interleaving blocks using:

$$L(k) = \begin{cases} L_0, & k=0; \\ \mathrm{mod}[L(k-1)+L_d, K], & k > 1. \end{cases}$$

where: K is the interleaving block size, $L_0 \epsilon [0, K-1]$ is an integer value, and $L_d \epsilon [1, K-1]$ is a modulo difference between neighboring L(k)'s.

15. A method of interleaving a binary vector for transmission by an OFDM/OFDMA transmitter, comprising:
  generating a forward error correction encoded binary vector from binary data to be transmitted;
  reshaping the binary vector into a matrix;
  dividing the bits in respective rows of the matrix into an integer number of interleaving blocks;
  interleaving the bits in the respective interleaving blocks until each interleaving block in the matrix has been interleaved; and
  rotating bits in respective columns of the matrix, wherein the steps of reshaping the binary vector, dividing the rows into interleaving blocks, interleaving the bits in each interleaving block, and rotating the bits are performed in a single bit reordering operation on bits in the binary vector using a rotation/interleaving index lookup table.

16. The method as claimed in claim 15 wherein the binary vectors are represented by $v=[v_1 \ v_2 \ \ldots \ v_m]$ where $v_i = [b_{i,1}' \ \ldots \ b_{i,N_i}']$ is a binary sequence received from an encoder, and reshaping the binary vector comprises reshaping each $v_i$ into an $N_{b/sub}$ by $N_i/N_{b/sub}$ sub-matrix $$M_i = \begin{bmatrix} b'_{i,1} & b'_{i,2} & \cdots & b'_{i,N_i/N_{b/sub}} \\ b'_{i,N_i/N_{b/sub}+1} & b'_{i,N_i/N_{b/sub}+2} & \cdots & b'_{i,2N_i/N_{b/sub}} \\ \cdots & \cdots & \cdots & \cdots \end{bmatrix},$$

and reshaping the vector v into a matrix $M=[M_1 \ M_2 \ \ldots \ M_m]$.

17. The method as claimed in claim 15 wherein interleaving the bits in the respective interleaving blocks comprises computing interleaved indices L(k) for respective bits of the respective interleaving blocks using:

$$L(k) = \begin{cases} L_0, & k=0; \\ \mathrm{mod}[L(k-1)+L_d, K], & k > 1. \end{cases}$$

where: K is the interleaving block size, $L_0 \epsilon [0, K-1]$ is an integer value, and $L_d \epsilon [1, K-1]$ is a modulo difference between neighboring L(k)'s.

18. The method as claimed in claim 17 wherein the largest common divisor of $L_d$ and K is 1.

19. The method as claimed in claim 17 wherein rotating the bits in the respective columns of the matrix M comprises rotating an i'th column $[b_{0,i} \ldots b_{j,i} \ldots b_{N_{b/sub}-1,i}]^T = \{b_{j,i}\}$ $(j=0, \ldots, N_{b/sub}-1)$ of the matrix so that the rotated column is $\{b_{j',i}\}$, where $j'=\mathrm{mod}\ [(i-1)\cdot k_d+k_0+j, N_{b/sub}]$; $k_0$ is a rotated index for $b_{0,1}$; and, $k_d$ is a rotation step size.

20. The method as claimed in claim 19 wherein parameters for $k_d$ and $k_0$ are $k_d=1$ or $-1$, $k_0=0$.

* * * * *